(12) United States Patent
Oku et al.

(10) Patent No.: US 7,529,251 B2
(45) Date of Patent: May 5, 2009

(54) DATA TRANSFER DEVICE

(75) Inventors: Tomoyuki Oku, Kokubunji (JP); Takeki Yazaki, Hachioji (JP); Michitaka Okuno, Kokubunji (JP); Minoru Hidaka, Kunitachi (JP); Shinichi Akahane, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 547 days.

(21) Appl. No.: 11/211,570

(22) Filed: Aug. 26, 2005

(65) Prior Publication Data

US 2006/0123136 A1 Jun. 8, 2006

(30) Foreign Application Priority Data

Dec. 2, 2004 (JP) ............................. 2004-349265

(51) Int. Cl.
*H04L 12/28* (2006.01)
*H04L 12/56* (2006.01)
*G06F 12/00* (2006.01)
*G06F 13/00* (2006.01)

(52) U.S. Cl. ................... 370/395.32; 771/108

(58) Field of Classification Search ............... 370/389, 370/392, 395.31, 395.32, 229, 231, 235, 370/351, 355, 356, 378, 379, 381, 382, 383, 370/394, 395.42, 395.71, 400, 412, 413, 370/428, 471, 429; 711/108, 114, 216; 709/236, 709/238, 245, 246

See application file for complete search history.

(56) References Cited

U.S. PATENT DOCUMENTS

| 5,633,858 | A  | * | 5/1997  | Chang et al. ................ 370/255 |
| 6,735,670 | B1 | * | 5/2004  | Bronstein et al. ........... 711/108 |
| 7,069,372 | B1 | * | 6/2006  | Leung et al. ................ 710/306 |
| 2003/0065772 | A1 | * | 4/2003 | Hata .......................... 709/224 |
| 2003/0108056 | A1 | * | 6/2003 | Sindhu et al. ............... 370/401 |
| 2004/0103236 | A1 |   | 5/2004 | Yoneda |
| 2006/0095654 | A1 | * | 5/2006 | Miller et al. ................ 711/108 |
| 2007/0280248 | A1 | * | 12/2007 | Herring et al. .............. 370/392 |

OTHER PUBLICATIONS

Hidell et al., "Router Architectures", Tutorial at Networking 2004, KTH IMIT, Stockholm, Sweden, {mahidell, psj, olofh} @imit.kth.se, pp. 1-152.

* cited by examiner

*Primary Examiner*—Chirag G Shah
*Assistant Examiner*—Ashley L Shivers
(74) *Attorney, Agent, or Firm*—Reed Smith LLP; Juan Carlos A. Marquez, Esq.

(57) ABSTRACT

A high quality network is provided that eliminates the sorting time for sorting through registering look-up conditions, such as source and destination MAC addresses, in a content addressable memory, by generating a routing or flow control look-up key, and then selectively activating some of the physical banks in the content addressable memory with the look-up key during look-up for the look-up conditions. The look-up key is generated by extracting a part or all of the data contained in a packet header.

21 Claims, 12 Drawing Sheets

FIG. 12

320 FLOW IDENTIFICATION CONTENT ADDRESSABLE MEMORY ARRAY

| SOURCE ADDRESS | DESTINATION ADDRESS | SOURCE PORT NUMBER | DESTINATION PORT NUMBER |
|---|---|---|---|
| | | | |
| | | | |
| | | | |
| | | | |
| | | | |
| | | | |

PHYSICAL BANK #0 (columns 1-2), PHYSICAL BANK #1 (columns 3-4), PHYSICAL BANK #2 (columns 5-6) ...

DATA TRANSFER DEVICE

CLAIM OF PRIORITY

The present application claims priority from Japanese application JP 2004-349265 filed on Dec. 2, 2004, the content of which is hereby incorporated by reference into this application.

FIELD OF THE INVENTION

The present invention relates to a data transfer device which performs routing and packet flow control, and more specifically, reduces power consumption during content addressable memory access.

BACKGROUND OF THE INVENTION

Data transfer devices which form a communication network, such as a layer 2 switch, IP router or layer 3 switch, transfer a received Ethernet (Ethernet: proprietary product name) frame, IP packet or MPLS packet transmitted by the MPLS method, to an output circuit corresponding to the address data of this packet. To reduce power consumption in the data transfer device accompanying the increase in traffic, various power consumption reduction methods are being examined.

As a way of reducing power consumption during content addressable memory access, there is a method wherein look-up conditions are first arranged in a desired registration order in a content addressable memory, and rearranged in order of increasing (or decreasing) value (e.g., Patent document 1). At this time, the value of the look-up condition situated at the boundary of each physical bank in the content addressable memory is stored in a register. In this example, a data look-up device of low power consumption is provided by limiting the physical banks to be looked up by the value of the look-up key generated from the inputted data, when looking up the look-up condition using the content addressable memory by comparing with the value of this register, and activating only the limited physical banks.

In addition, there is a method wherein, to reduce power consumption in a content addressable memory for routing of received IP packets, a physical bank to be activated is decided by a hash function (e.g., Non-patent document 1).

[Patent document 1] JP-A No. 185792/2004

[Non-patent document 1] [Hidell et al], "Router Architectures" Tutorial at Networking 2004, http://www.imit.kth.se/~mahidell/pubs/networking04_tutorial_final.pdf, pp. 41

SUMMARY OF THE INVENTION

In a method which arranges look-up conditions in a desired registration order, although they are arranged in a desired registration order at the beginning in the content addressable memory, whatever the look-up method may be, e.g., full match look-up or longest match look-up, the data in the content addressable memory always have to be rearranged. Therefore, a sorting time is always required for rearrangement when the network configuration changes or during initial registration.

Next, in the method which decides the physical bank to be activated by a hash function, only the look-up condition for routing the received IP packet is looked up, and the details of how to reduce power consumption method are not considered.

It is therefore an object of the invention, when performing a full match look-up of a content addressable memory, to provide a high quality network which does not incur a sorting time when registering look-up conditions, and to provide a data transfer device of low power consumption by limiting the physical banks to be activated when the look-up conditions are looked up.

In order to attain this object, the data transfer device of the invention comprises multiple physical banks in which a forwarding table and a flow identification table have identical look-up bit width, and a forwarding table management unit and a flow identification table management unit decide the physical bank to be looked up from a look-up key and commands look-up of this physical bank.

According to the present invention, a low power consumption type data transfer device which can limit the physical banks of a content addressable memory to be activated for a content addressable memory which requires full match look-up in the case of routing and flow control of received packets, can be provided. Moreover, when the network configuration is modified or during initial registration, since all the look-up conditions arranged in the content addressable memory do not have to be rearranged as in the prior art, registration of look-up condition data can be rapidly completed, and a high quality network can be provided which is easily maintained.

BRIEF DESCRIPTION OF THE DRAWINGS

FIG. 12 is a diagram showing a content addressable memory array 320 for flow identification.

DETAILED DESCRIPTION OF THE PREFERRED EMBODIMENTS

First Embodiment

Figure 1:
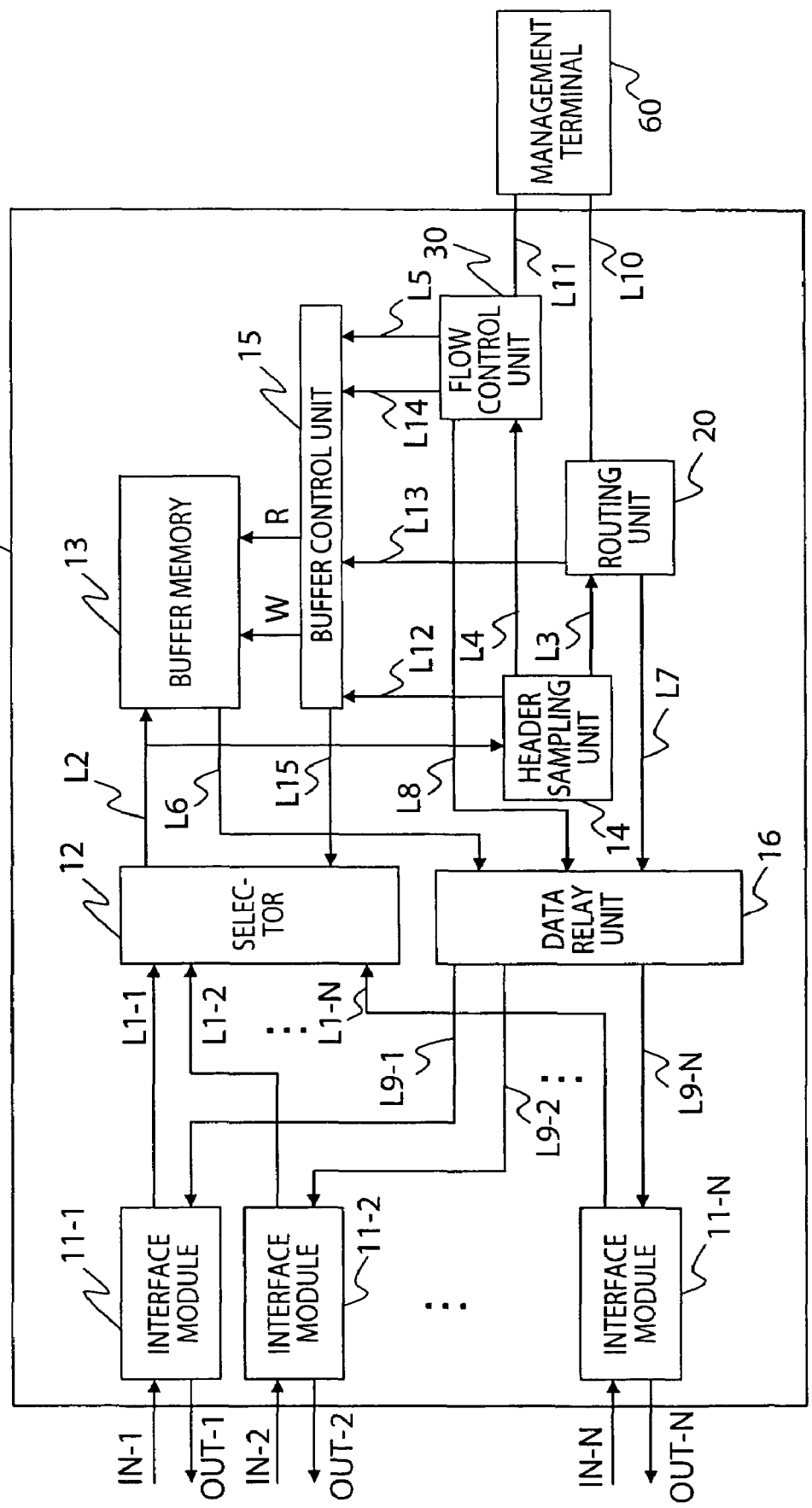
FIG. 1 is a block diagram showing one embodiment of a data transfer device 10 according to the invention.

Hereafter, one embodiment of the invention will be described referring to the drawings. In order to easily make comparisons with the prior art, the case where the invention is applied to a data transfer device 10 of FIG. 1 will be described. In addition, in the first embodiment, transfer of an Ethernet frame which requires a full match look-up in packet routing and flow control using a content addressable memory, is described. However, provided that the effect of the invention is obtained, the kind of the device to which the invention is applied and the type of packet are not limited thereto.

FIG. 1 is a block diagram of the data transfer device 10 according to the invention.

The data transfer device 10 comprises multiple interface modules 11-$i$ ($i=1$ to N) connected to input circuits IN-i and output circuits OUT-i, respectively, a selector 12 and data relay unit 16 connected to these interface modules, a buffer memory 13, a header sampling unit 14 and buffer control unit 15 connected to the selector 12, and a routing unit 20 and flow control unit 30 connected to the data relay unit 16. 60 represents a management terminal situated outside the data transfer device 10, wherein a signal line L10 is connected to the routing unit 20 and a signal line L11 is connected to the flow control unit, which is operated by the administrator of the data transfer device 10.

Figure 2:
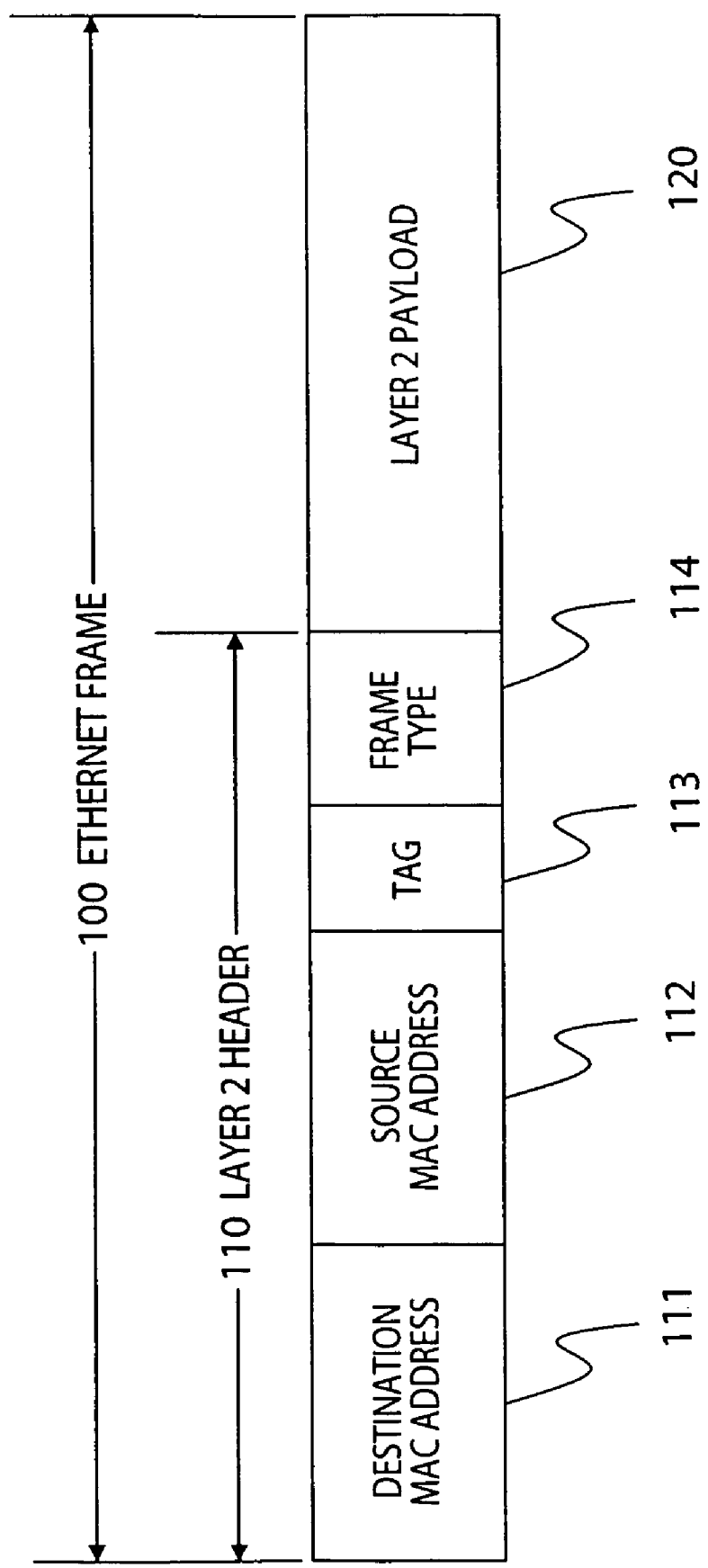
FIG. 2 is a diagram showing one example of the format of a variable-length Ethernet frame inputted into the data transfer device 10.

FIG. 2 shows one example of the format of a variable-length Ethernet frame received from the input circuits IN-i. A variable-length Ethernet frame 100 comprises a L2 header 110 and L2 payload 120 of a second layer (data link layer) in an OSI reference model.

The format of the L2 header 110 changes according to the type of input circuit, for example when the input circuit IN-i is Ethernet, a destination MAC address 111, source MAC address 112, frame type 114 and other data are contained in the L2 header 110. In FIG. 2, a tag 113 is stored in the L2 header 110 as the other data.

Here, the tag 113 comprises the Ethernet frame transfer priority in the data transfer device 10 and a network identifier which identifies the network to which the Ethernet frame belongs.

In FIG. 1, each interface module 11-$i$ outputs the Ethernet frame received from the input circuit IN-i to a signal line L1-$i$. The selector 12 selectively outputs the Ethernet frames inputted from the signal line L1-$i$ to a signal line L2 according to a control signal supplied via a signal line L15 from the buffer control unit 15. The header sampling unit 14 analyzes the L2 header 110 of the Ethernet frame 100 outputted to the signal line L2, outputs the frame length shown in the frame type 114 to a signal line L12, outputs the destination MAC address 111 and source MAC address 112 to a signal line L3, and outputs the L2 header 110 to a signal line L4.

The buffer control unit 15 performs write of the Ethernet frame 100 outputted to the signal line L2 to the buffer memory 13 and read of the Ethernet frame 100 to the signal line L6 from the buffer memory 13. The buffer control unit 15, based on the frame length which the header sampling unit 14 outputs to the signal line L12, controls write of the Ethernet frame to the buffer memory 13, and together with read of the Ethernet frame from the buffer memory 13, outputs a switching control signal of the selector 12 to the signal line L15 and writes the following Ethernet frame to the buffer memory 13.

Figure 3:
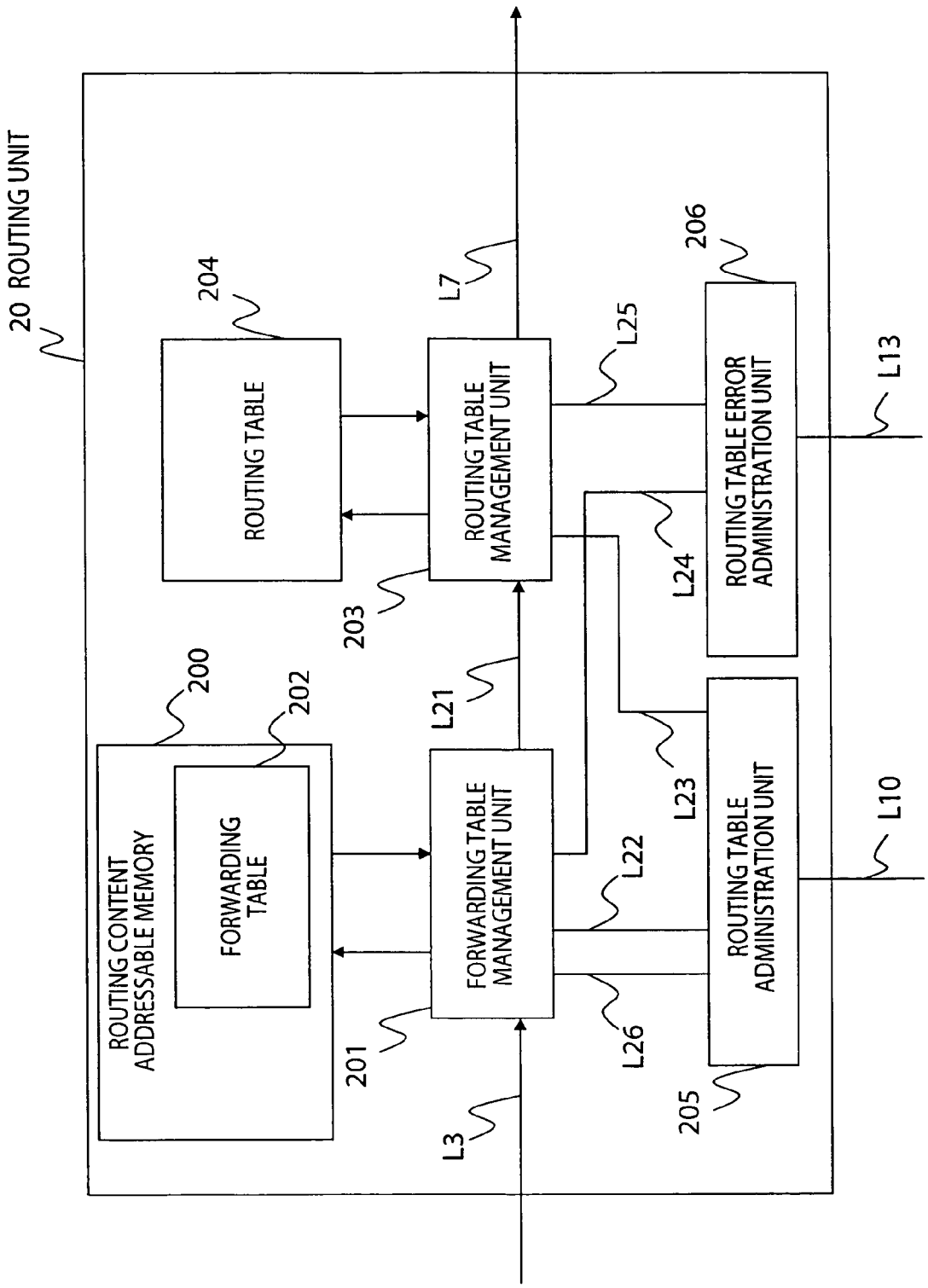
FIG. 3 is a block diagram showing one embodiment of a routing unit 20.
Figure 7A:
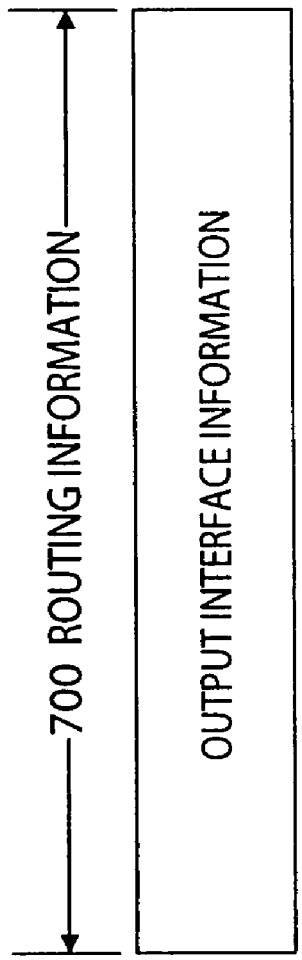
FIG. 7A is a diagram showing the format of a routing information 700 stored in the entries of a routing table 204.

The routing unit 20 looks up the matching look-up condition from the forwarding table 202 stored in the routing content addressable memory 200 based on the destination MAC address 111 outputted by the header sampling unit 14 to the signal line L3, as shown in FIG. 3. As a result of looking up the look-up conditions, when there is a match, routing information 700 is looked up from the routing table 204. The routing information 700 contains data on the output interface module of the Ethernet frame, as shown in FIG. 7A. The routing unit 20 outputs the routing information 700 to a signal line L7.

Simultaneously with the routing of the Ethernet frame, the routing unit 20 looks up the matching look-up condition from the forwarding table 202 stored in the routing content addressable memory 200 based on the source MAC address 112 which the header sampling unit 14 outputs to the signal line L3. If, as a result of this look-up, a matching look-up condition does not exist, the forwarding table management unit 201 transmits the L2 header 110 of the Ethernet frame to a routing table administration unit 205 via a signal line L22. The routing table administration unit 205 outputs data required for updating the forwarding table 202 to the signal line L22 based on the L2 header 110.

When performing dynamic routing, the routing table administration unit 205 outputs routing data according to a routing protocol to the signal line L22 or L23 connected to the forwarding table management unit 201 or the routing table management unit 203. When performing static routing, it outputs routing data according to a setup inputted from the management terminal 60 connected via the signal line L10.

When an error is contained in the data outputted from the forwarding table 202 and routing table 204 which are accessed at the time of routing, the routing table error administration unit 206 notifies a routing table error from the forwarding table management unit 201 or routing table management unit 203 to the buffer control unit 15 via a signal line L13. If a routing table error is inputted from the signal line L13 at this time, the buffer control unit 15 will interpret the routing as invalid, and will discard the Ethernet frames stored in the buffer memory 13.

Figure 4:
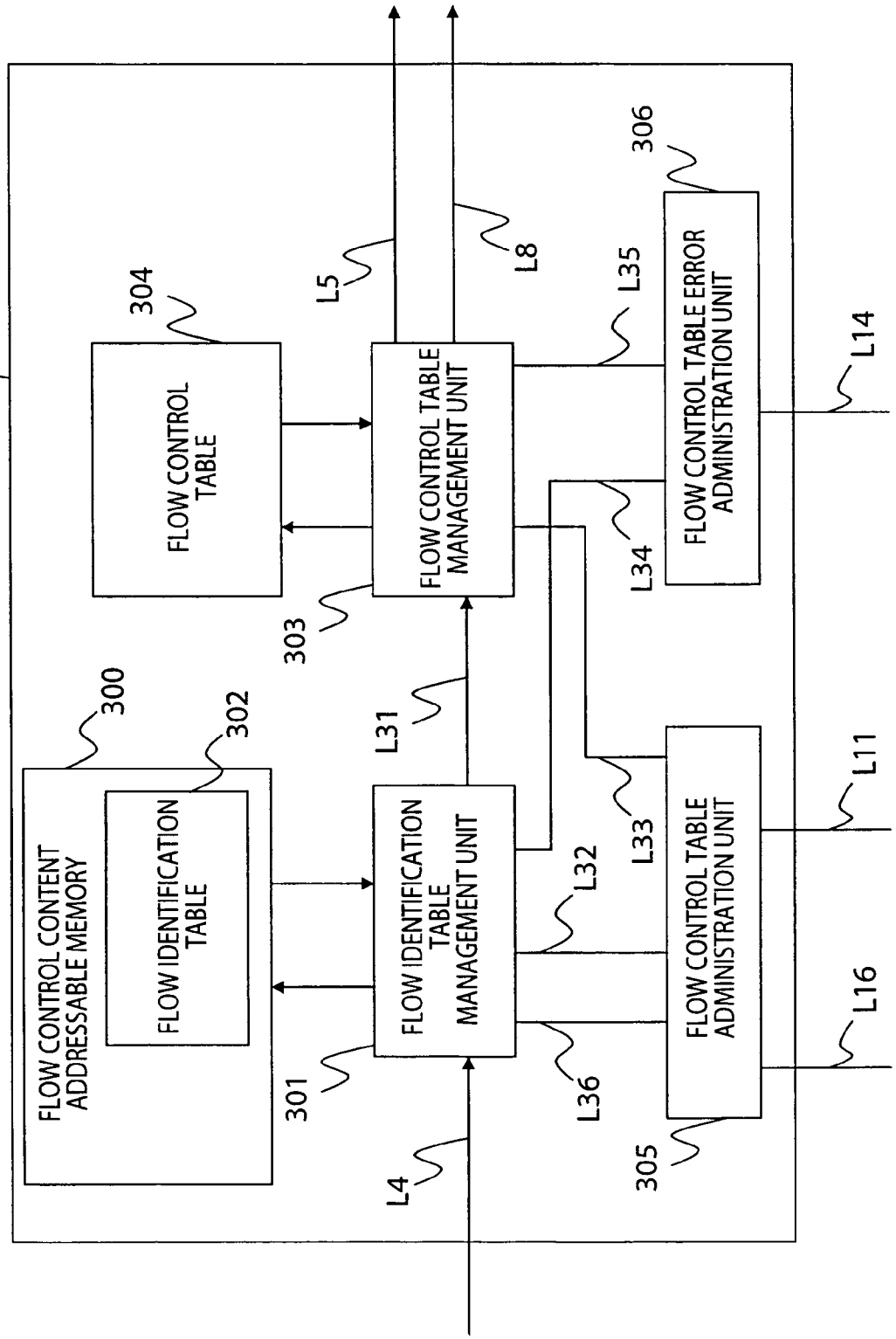
FIG. 4 is a block diagram showing one embodiment of a flow control unit 30.
Figure 7B:
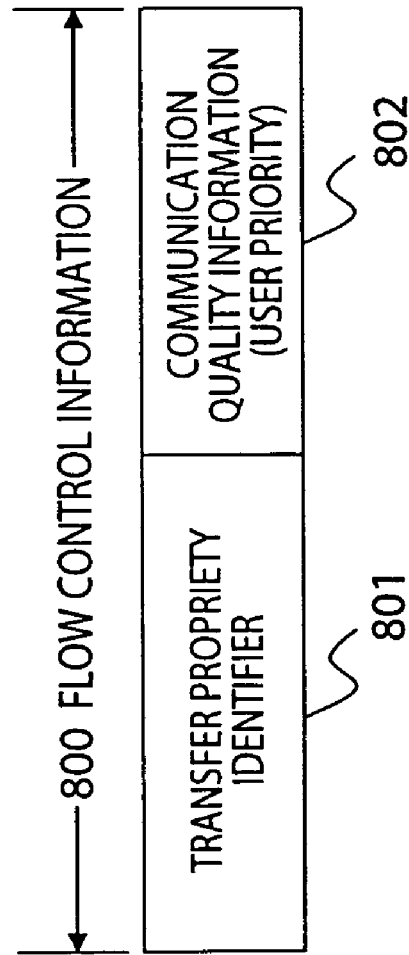
FIG. 7B is a diagram showing the format of a flow control information 800 stored in the entries of a flow control table 304 during an Ethernet frame transfer.

The flow control unit 30 looks up the matching look-up condition from the flow identification table 302 stored in the flow control content addressable memory 300 based on the L2 header 110 which the header sampling unit 14 outputs to the signal line L4, as shown in FIG. 4. As a result of looking up the look-up conditions, when there is a match, flow control information 800 are looked up from the flow control table 304. The flow control information 800 contains for example communication quality information 802 which shows a transmitting priority, and transfer propriety identifier 801, as shown in FIG. 7B. The flow control unit 30 outputs the transfer propriety identifier 801 to a signal line L5, and outputs the communication quality information 802 to a signal line L8.

More specifically, the flow control unit 30, at a predetermined timing, requests the buffer control unit 15 to perform control of the received Ethernet frame 100 via the signal line L5. The buffer control unit 15 controls the Ethernet frame 100 according to the inputted transfer propriety identifier 801. When transfer is performed, the buffer control unit 15 outputs the Ethernet frame to the signal line L6 from the memory buffer 13. When transfer is not performed, the Ethernet frame stored in the memory buffer 13 is discarded.

The flow control table administration unit 305 is connected to the management terminal 60 via a signal line L11. According to the flow control setup from the management terminal 60, flow control information is outputted to a signal line L32 or L33 connected to the flow identification table management unit 301 or flow control table management unit 303. When an error is contained in the data outputted from the flow identification table 302 and flow control table 304 which are accessed during flow control, the flow control table error administration unit 306, notifies a flow control table error from the flow identification table management unit 301 or flow control table management unit 303 to the buffer control unit 15 via a signal line L14.

If a flow control table error is inputted from the signal line L14 at this time, the buffer control unit 15 will interpret the flow control as invalid, and will discard the Ethernet frames stored in the memory buffer 13.

The data relay unit 16, when an Ethernet frame 100 is inputted from the signal line L6, outputs this to an interface module 11-$k$ corresponding to an output port number k shown by the routing information 700 from the signal line L7 according to the priority shown in the communication quality data 802 inputted from the signal line L8.

Figure 5:
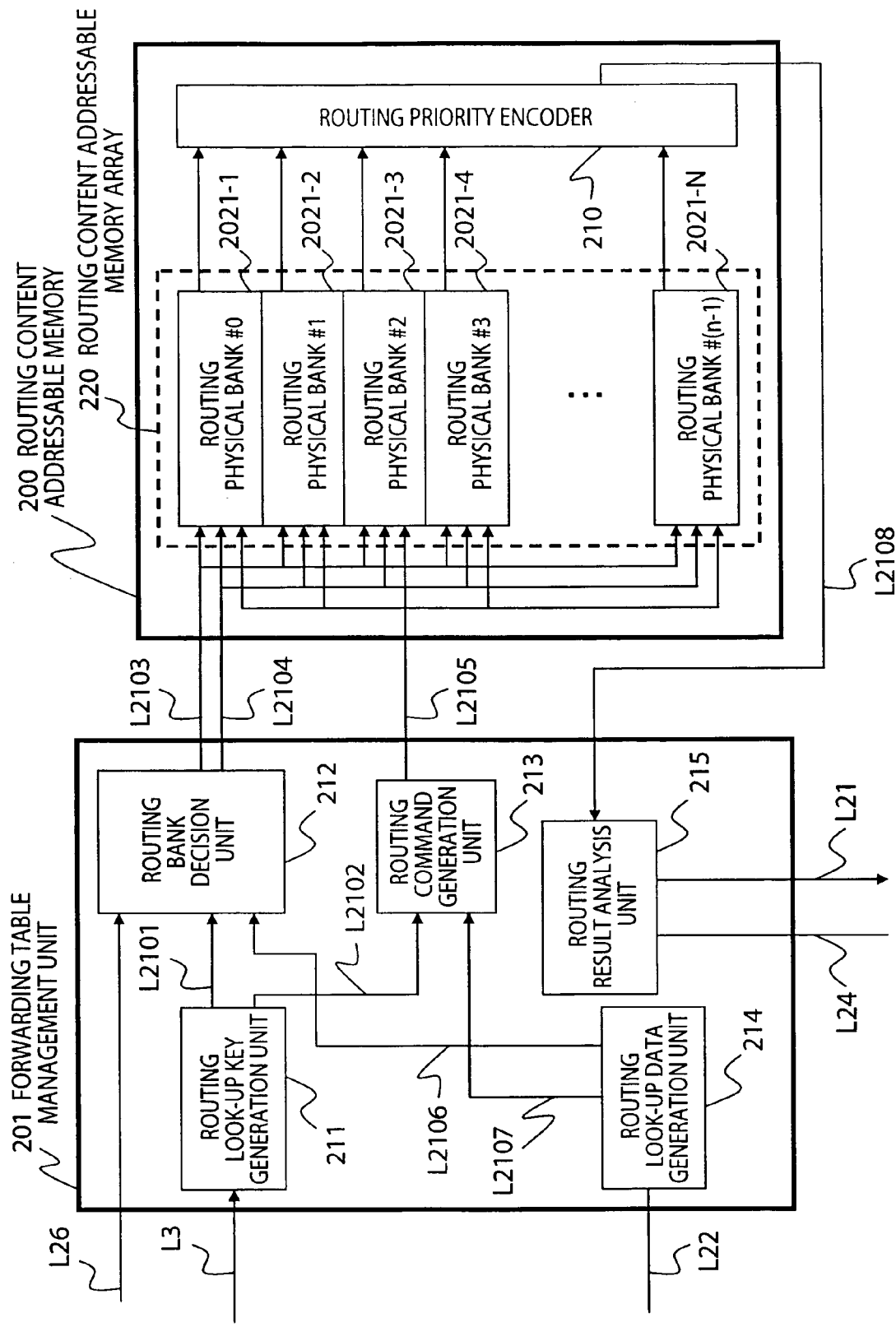
FIG. 5 is a diagram showing one embodiment of a forwarding table management unit 201, and a diagram showing the relation between a forwarding table management unit 201 and a content addressable memory 200 for routing.

FIG. 5 shows the types of connection to the forwarding table management unit 201 and routing content addressable memory 200 applied to the routing unit 20 of the invention. For simplification, it will be assumed that the routing content addressable memory 200 comprises a routing content addressable memory array 220 and a routing priority encoder 210, as shown in FIG. 5. The routing content addressable memory array 220 comprises multiple routing physical banks 2021-$i$ ($i=1$ to N) containing one or more entries which store routing look-up data used as look-up conditions.

Figure 11:
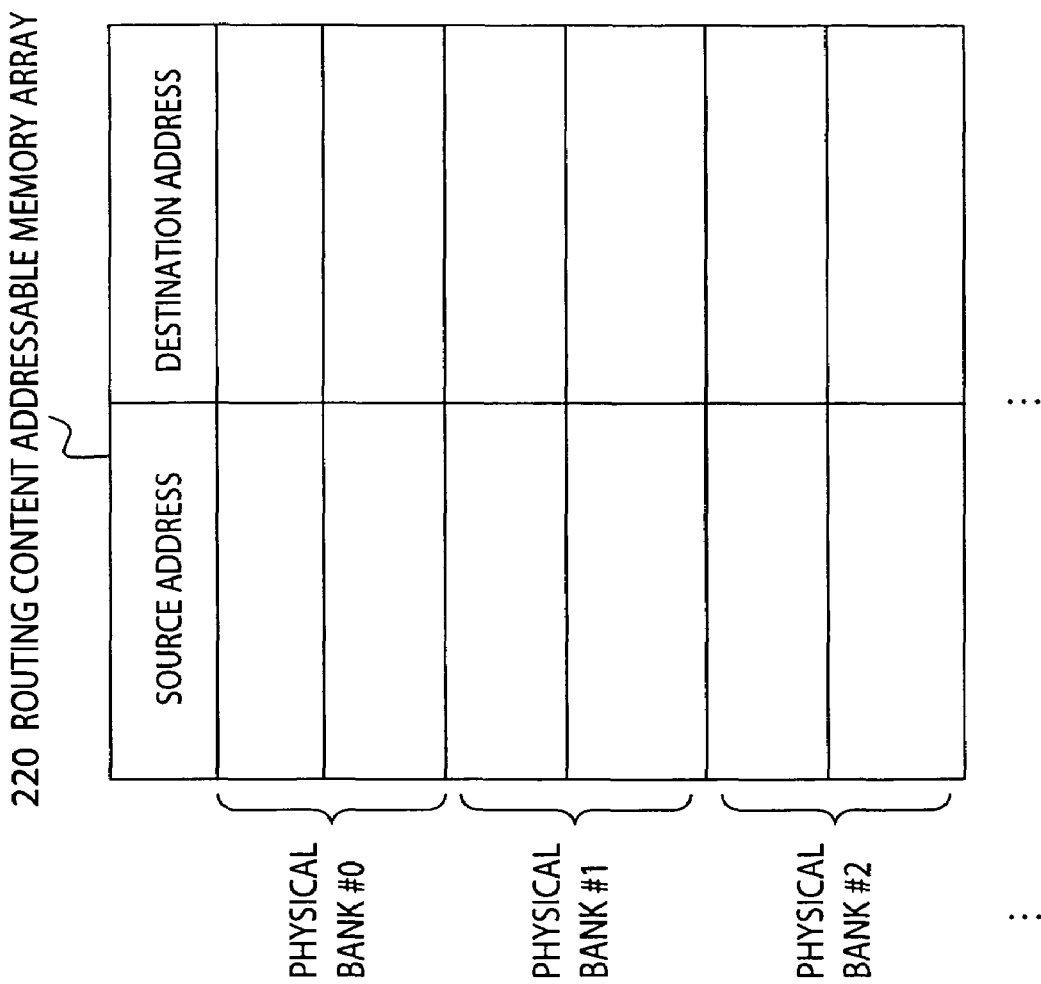
FIG. 11 is a diagram showing a content addressable memory array 220 for routing.

As shown in FIG. 11, look-up conditions such as, for example, the source address and destination address, are stored in the entries. A routing look-up key and source MAC address look-up key are inputted into the content addressable memory 200 for routing, and if there is a match with multiple entries of the forwarding table 202, the routing priority encoder 210 outputs the minimum (or maximum) address of the matching entries to a signal line L2108.

According to the invention, in the routing of Ethernet frames and the registration of the routing information for the forwarding table 302, the physical banks to be activated are limited by a routing bank decision unit 212.

The forwarding table management unit 201 will now be described referring to FIG. 5. Based on the destination MAC address 111 and source MAC address 112 of the Ethernet frame 100, a routing look-up key generation unit 211 generates the routing look-up key and source MAC address look-up key corresponding to each, and outputs them to a signal line L2101. A routing command generation unit 213 is then requested to look up the look-up condition matching the routing or source MAC address of the Ethernet frame via a signal line L2102.

When a look-up condition to be registered in the forwarding table 202 from the signal line L22 is inputted, a routing look-up data generation unit 214 generates routing look-up data to be used as the look-up condition of the routing look-up key and source MAC address look-up key, and outputs the routing look-up data to a signal line L2106. It also requests write of the routing look-up data to the forwarding table 202 by outputting the routing look-up data to a signal line L2107.

Figure 9:
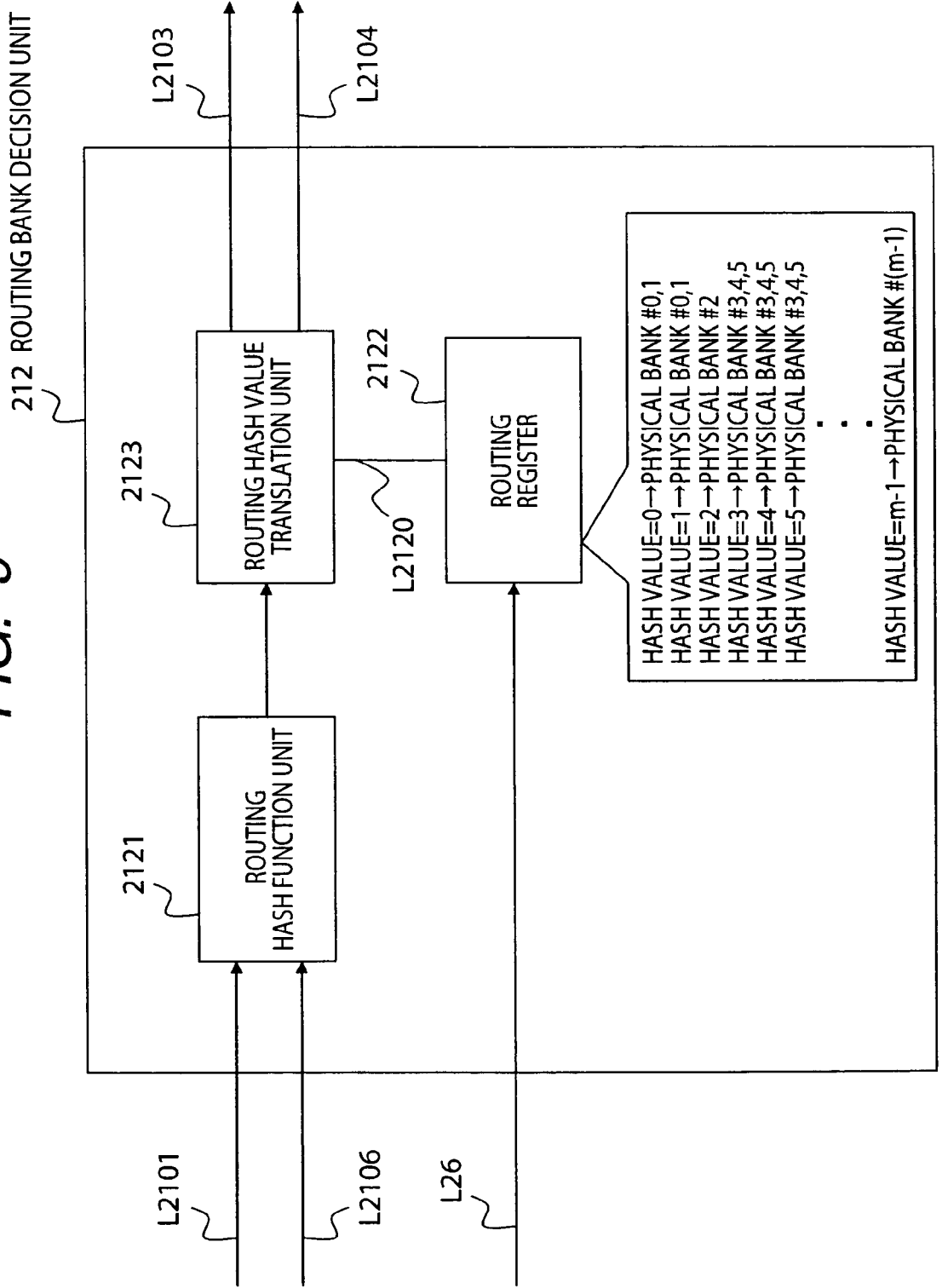
FIG. 9 is a block diagram showing one embodiment of a routing bank decision unit 212.

The routing bank decision unit 212 takes the routing look-up data and source MAC address look-up key inputted from the signal line L2101, or the routing look-up key inputted from the signal line L2106 as input, and outputs the activation power to the physical banks to be made active and the routing lookup key or routing look-up data to the routing content addressable memory 200. The routing bank decision unit 212 comprises a routing hash function unit 2121 which calculates the numbers of the physical banks to be made active relative to the input by a hash function, a routing register 2122 connected to a signal line L26, and a routing hash value translation unit 2123 which converts the hash values calculated by the routing hash function unit 2121 to the values shown in the routing register 2122, and decides the physical banks to be made active, as shown in FIG. 9.

The routing hash function unit 2121 calculates a surplus by dividing the routing look-up key and source MAC address look-up key by a number (m) of routing physical banks 2021-$i$ having an identical look-up bit width used for routing. Let this surplus value be the hash value. The input routing look-up key and source MAC address look-up key, or routing look-up data and hash value, are then outputted to the routing hash value translation unit 2123. At this time, the range of hash values is 0 to (m−1).

A discrepancy may arise in the hash values outputted depending on the routing look-up data inputted into the routing hash function unit 2121. Hence, to eliminate hash value discrepancies as much as possible, as shown in FIG. 9, hash values are set in the routing register 2122 which shows the physical bank numbers to be made active corresponding to each hash value.

The operator of the data transfer device 10 performs setup of the routing register 2122 from the management terminal 60. Here, the operator of the data transfer device 10 specifies the physical bank corresponding to the hash value.

When the routing look-up key and source MAC address look-up key or routing look-up data and hash value are inputted the routing hash value translation unit 2123 refers to the routing register 2122 and outputs the activation power for the physical bank corresponding to the hash value to a signal line L2104. At this time, the routing look-up key and source MAC address look-up key, or routing look-up data, are outputted to a signal line L2103. Standby power is supplied to the other physical banks.

When the routing look-up key and source MAC address look-up key are inputted from the signal line L2102, the routing command generation unit 213 generates a look-up command, and outputs it to a signal line L2105. Also, when the routing look-up data for the forwarding table 202 is inputted from the signal line L2107, a write command is generated and output to the signal line L2105. It may be noted that signal lines, such as a clock bus for the routing content addressable memory 200, are connected to the routing command generation unit 213, but are not shown in FIG. 5.

A routing result analysis unit 215, in the routing content addressable memory 200 which stores the forwarding table 202, analyzes whether the address of the entry which matches the routing look-up key outputted from the routing content addressable memory 200 as the look-up result of the forwarding table 202, is valid or invalid. If it is invalid, this is notified to the routing table error administration unit 206 via a signal line L24.

Figure 6:
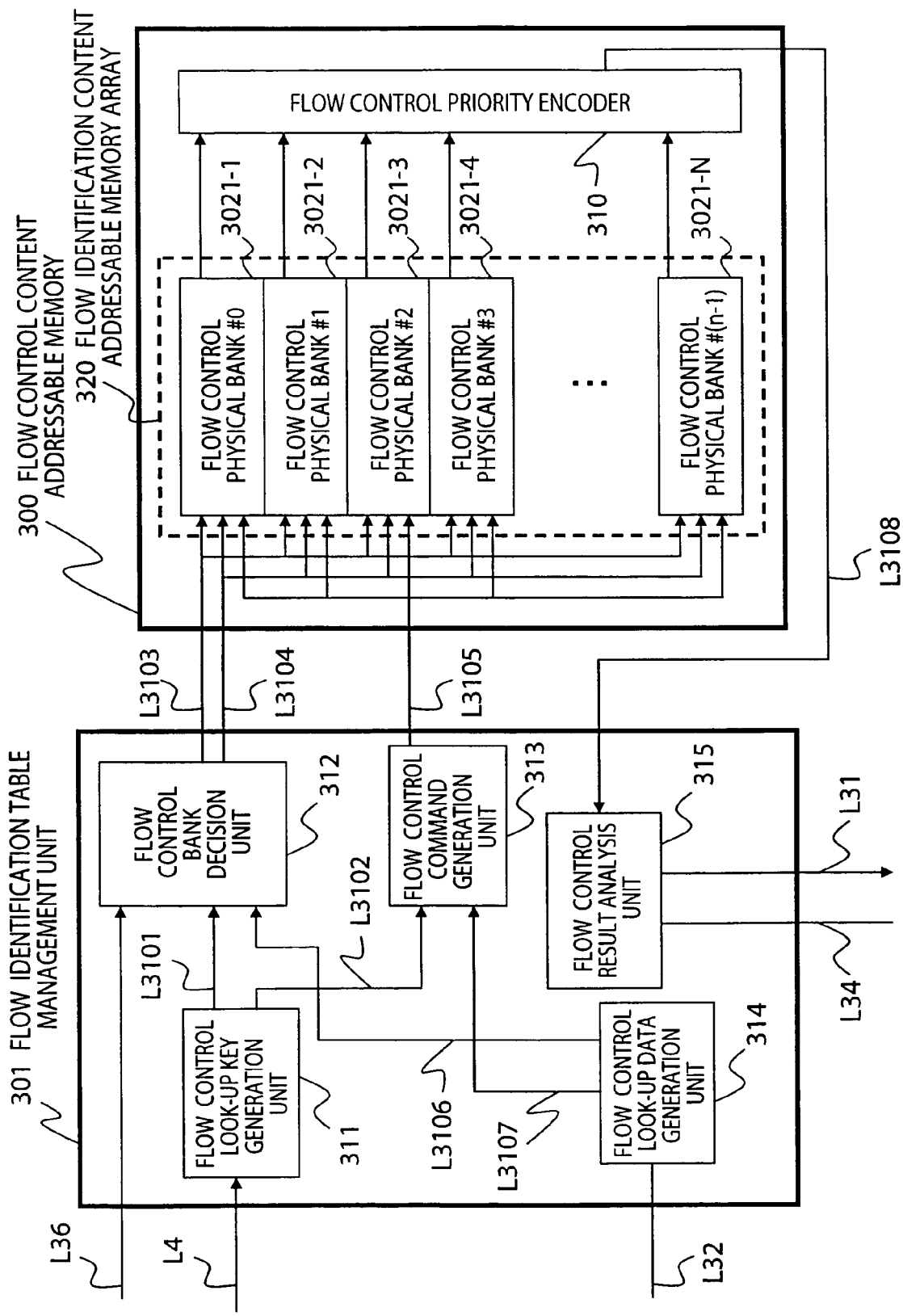
FIG. 6 is a diagram showing one embodiment of a flow identification table management unit 301, and a diagram showing the relation between a flow identification table management unit 301 and content addressable memory 300 for flow control.

FIG. 6 shows how the flow identification table management unit 301 applied to the flow control unit 30 of the invention is connected to the flow control content addressable memory 300. For simplification, as shown in FIG. 6, the flow control content addressable memory 300 comprises a flow identification content addressable memory array 320, and a flow control priority encoder 310. The flow identification content addressable memory array 320 comprises multiple flow control physical banks 3021-$i$ ($i=1$ to N) containing one or more entries which store flow control look-up data used as look-up conditions of the flow control look-up key.

As shown in FIG. 12, look-up conditions such as a source address, destination address, source port number and destination port number are stored in the entries.

The flow control look-up key is inputted into the flow control content addressable memory 300, and if there are matches with multiple entries of the flow identification table 202, the flow control priority encoder 310 outputs the minimum (or maximum) address of the matching entries to a signal line L3108.

According to the invention, in the flow control of Ethernet frames and the registration of flow control information for the flow control table 302, the physical banks to be activated are limited by a flow control bank decision unit 312.

The flow identification table management unit 301 will now be described referring to FIG. 6. Based on a combination of the destination MAC address 111 of the L2 header 110 and network identifier contained in the tag 113, a flow control look-up key generation unit 311 generates the flow control look-up key and outputs it to a signal line L3101. A flow control command generation unit 313 is then requested for a flow identification to which the input Ethernet frame belongs via the signal line L3102.

When the operator of the data transfer device 10 inputs the data elements of the look-up conditions from the management terminal 60, the flow control look-up data generation unit 314 generates flow control look-up data to be used as look-up conditions of the flow control look-up key, and outputs the flow control look-up data to the signal line L3106. Also, it requests write of the flow control look-up data to the flow identification table 302 via the signal line L3107.

Figure 10:
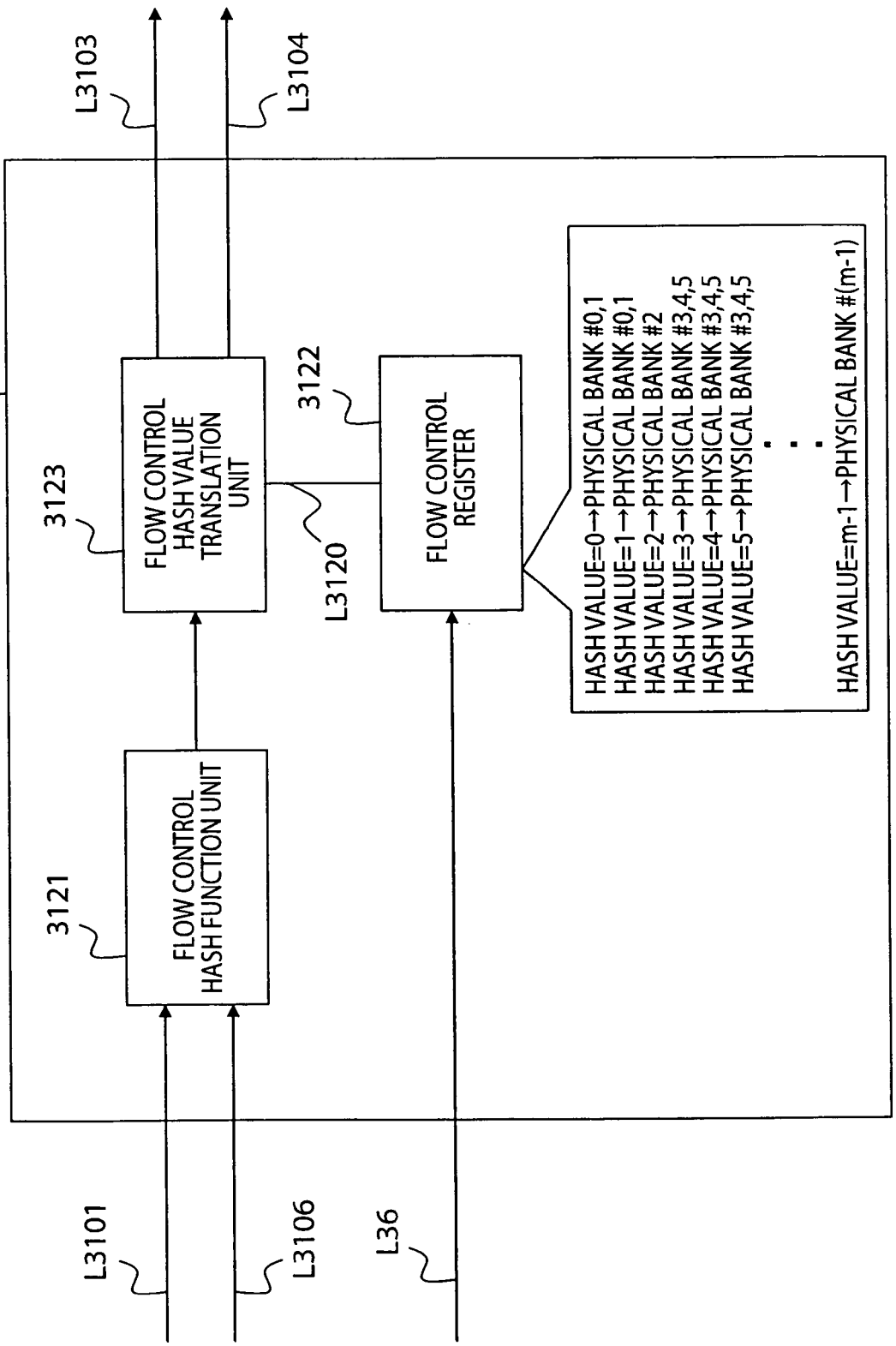
FIG. 10 is a block diagram showing one embodiment of a flow control bank decision unit 312.

The flow control bank decision unit 312 uses the flow control look-up key inputted from signal line L3101 or the flow control look-up data inputted from the signal line L3106 as input, and outputs the activation power to the physical banks to be made active and the flow control look-up key or flow control look-up data to the flow control content addressable memory 300. The flow control bank decision unit 312 comprises a flow control hash function unit 3121 which calculates the numbers of the physical banks to be made active relative to the input by a hash function, a flow control register 3122 connected to a signal line L36, and a flow control hash value translation unit 3123 which converts the hash values calculated by the flow control hash function unit 3121 to the values shown in the flow control register 3122, and decides the physical banks to be made active, as shown in FIG. 10.

The hash function unit 3121 for flow control calculates a surplus by dividing the flow control look-up key or flow control look-up data by a number (m) of flow control physical banks 3021-$i$ having an identical look-up bit width used for flow control. Let this surplus value be the hash value. The input flow control look-up key or flow control look-up data and the hash value, are then outputted to the flow control hash value translation unit 3123. At this time, the range of hash values is 0 to (m−1).

A discrepancy may arise in the hash values outputted depending on the flow control look-up data inputted into the flow control hash function unit 3121. Hence, to eliminate discrepancies of hash values as much as possible, as shown in FIG. 10, hash values are set in the flow control register 3122 which shows the physical bank numbers to be made active corresponding to each hash value.

The operator of the data transfer device 10 performs setup of the flow control register 3122 from the management terminal 60. Here, the operator of the data transfer device 10 specifies the physical bank corresponding to the hash value.

When the flow control look-up key or flow control look-up data and hash value are inputted, the flow control hash value translation unit 3123 refers to the flow control register 3122 and outputs the activation power for the physical bank 3021-$i$ corresponding to the hash value to a signal line L3104. At this time, the flow control look-up key or flow control look-up data are outputted to a signal line L3103. Standby power is supplied to the other physical banks.

When the flow control look-up key is inputted from the signal line L3102, the flow control command generation unit 313 generates a look-up command, and outputs it to a signal line L3105. Also, when the flow control look-up data for the flow identification table 302 is inputted from the signal line L3107, a write command is generated and output to the signal line L3105. It may be noted that signal lines such as a clock bus for the flow control content addressable memory 300 are connected to the flow control command generation unit 313, but are not shown in FIG. 6.

The flow control result analysis unit 315, in the flow control content addressable memory 300 which stores the flow identification table 302, analyzes whether the address of the entry which matches the flow control look-up key outputted from the flow control content addressable memory 300 as the look-up result of the flow identification table 302, is valid or invalid. If it is invalid, this is notified to the flow control table error administration unit 306 via a signal line L34.

The routing hash function unit 2121 and flow control hash function unit 3121 always use the same calculation method for registration of routing look-up data and look-up of the forwarding table 202 by the routing look-up key, or registration of flow control look-up data and look-up of the flow identification table 302 by the flow control look-up key, respectively. Therefore, it is possible to match the routing look-up data and routing look-up key, and to match the flow control look-up data and flow control look-up key, when an Ethernet frame is received.

Although it was not mentioned in this aspect, the packet is not limited to an Ethernet frame, and may be a MPLS packet transmitted by the MPLS method. Thus, in the forwarding table 202 which the routing look-up key and routing look-up data access, and the flow identification table 302 which the flow control look-up key and flow control look-up data access, the routing bank decision unit 212 and flow control bank decision unit 312 not only reduce power consumption of the content addressable memory by limiting the physical banks to be activated, but when there is a change of network configuration and during initial registration, rearrangement of look-up conditions registered in the entries of the content addressable memory as in the prior art is not required, so registration of look-up conditions can be completed in a short period of time.

Second Embodiment

In the second embodiment, the case will be described where, in an IP router and layer 3 switch, flow control of IP packets transferred between networks which designate a specific source and destination, is performed.

Figure 8:
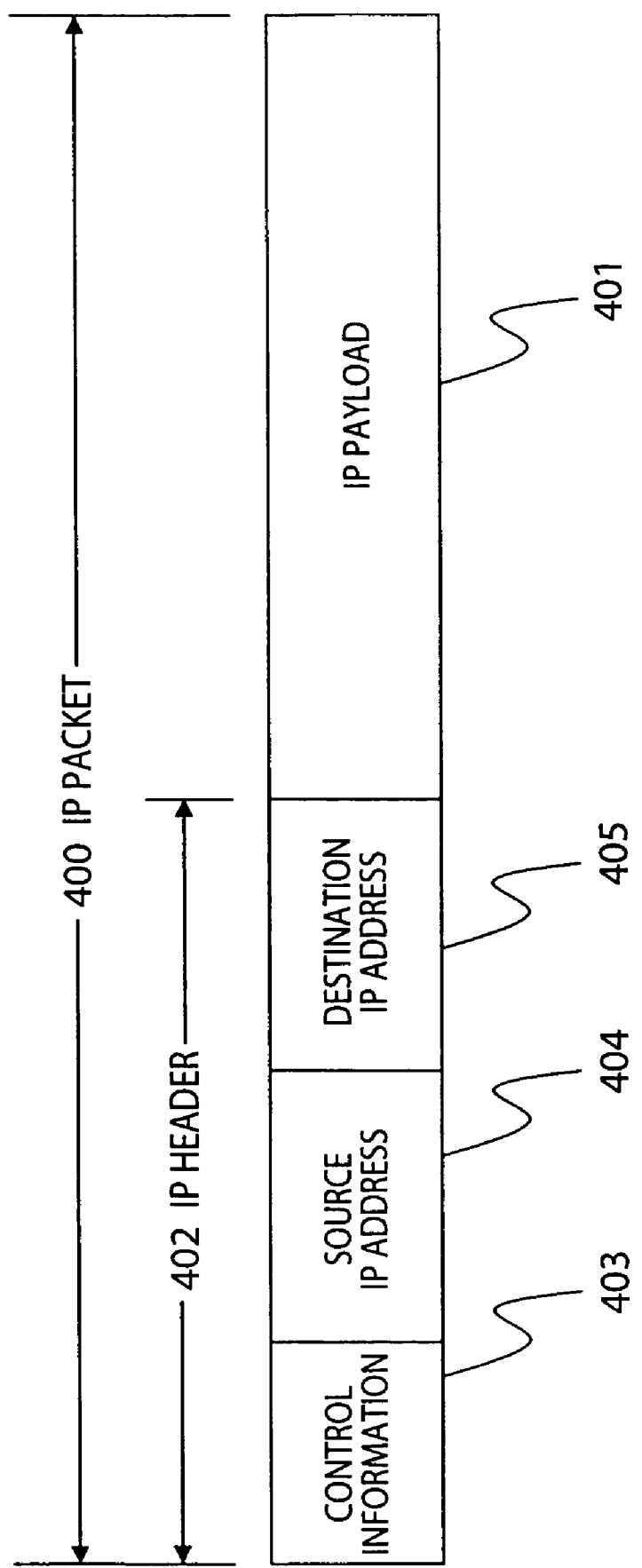
FIG. 8 is a diagram showing the format of a variable-length IP packet inputted into the data transfer device 10.

First, one example of the format of a variable-length IP packet 400 is shown in FIG. 8. As shown in FIG. 8, the IP packet 400 comprises a IP payload 401 and IP header 402, the IP header 402 containing a packet control data 403, source IP address 404 and destination IP address 405. The packet control data 403 means IP header data other than the IP address, e.g., the service type such as protocol classification, packet size and packet priority.

The flow control look-up key generation unit 311 generates flow control look-up data which are flow control look-up conditions from a combination of the protocol classification which is contained in the packet control data 403, source IP address 404 and destination IP address 405.

The flow control bank decision unit 312 then uses the flow control look-up data as input to decide the flow control physical bank 3021-$i$ which registers the flow control look-up data.

Next, the flow control of received IP packets will be described. The data transfer device 10 functions as in the first embodiment also during transfer of the IP packets.

The difference from the first embodiment is that, when the flow control look-up key generation unit 311 generates the flow control look-up key, it uses a combination of the protocol classification contained in the packet control data 403, source IP address 404 and destination IP address 405 of the inputted IP packets. Also, the header sampling unit 14 outputs a IP header 402.

In an IP packet transfer, the same data as in the first embodiment is stored in the flow control table 304. At this time, the flow control unit 30 performs the same operations as in the first embodiment. Further, the flow control hash function unit 3121 always uses the same calculation method for registration of flow control look-up data and look-up of the flow identification table 302 by the flow control look-up key.

Therefore, when a specific IP packet is received, the flow control look-up data and flow control look-up key can be matched.

According to the invention, in data transfer devices such as a layer 2 switch, IP router and layer 3 switch, power consumption in a content addressable memory can be reduced during packet routing and flow control, and regarding the registration of look-up conditions, a communication service which can rapidly respond to network configuration changes can be provided.

The invention can be applied to a data transfer device which uses a content addressable memory for packet routing and flow control.

What is claimed is:

1. A data transfer device, comprising:
   a plurality of input circuits into which a packet is inputted,
   a plurality of output circuits which output a packet,
   a routing unit which decides routing information which shows the output circuit of the input packet from data contained in the header of the input packet, and
   a data relay unit which transfers the packet to the output circuit corresponding to the routing information,
   wherein said routing unit is a data transfer unit comprising:
   a forwarding table management unit which extracts part or all of the data contained in a packet header, and performs look-up using this as a look-up key,
   a forwarding table for outputting data regarding a physical position in which a look-up condition is stored in a memory based on said look-up key,
   a routing table which stores routing information corresponding to said look-up condition stored at said physical position, and
   a routing table administration unit which looks up said routing information from said routing table based on said data regarding said physical position,
   wherein said forwarding table is stored in an array formed by a plurality of physical banks having an identical look-up bit width, and
   said forwarding table management unit comprises:
   a function unit which performs calculations for deciding a physical bank to be looked up from said look-up key, and
   a register which stores numbers for changing an output value of the function unit, and
   wherein the forwarding table management unit commands the look-up of said physical bank corresponding to the output value from said register.

2. The data transfer device according to claim 1, wherein said forwarding table management unit comprises:
   a look-up key generation unit which extracts unit or all of the data contained in said packet header, and generates said look-up key,
   a look-up condition generation unit which generates said look-up condition stored in said forwarding table,
   a command control unit which generates a look-up command to said forwarding table when looking up data relating to said physical position corresponding to said look-up key, and generates a write command when storing said look-up condition in said forwarding table,
   a physical bank decision unit which decides the physical bank to be looked up when looking up data relating to said physical position corresponding to said look-up key in said forwarding table, and decides the physical bank to be stored from said look-up condition.

3. The data transfer device according to claim 2, wherein:
   said physical bank decision unit uses said look-up key or said look-up condition as an input, and comprises:
   said function unit which outputs a value showing the number of the physical bank to be looked up when looking up data regarding said physical position corresponding to said look-up key, or outputs a number showing the number of the physical bank to be stored from said look-up condition,
   a register which shows the number of the physical bank corresponding to the output value from said function unit, and
   an output value converter which converts said output value into the number of the physical bank shown in the register, and commands look-up or registration of the physical bank shown by the converted value.

4. The data transfer device according to claim 3, wherein said register can be set from a terminal connected to the exterior of the data transfer device, and the state of said register can be verified from the terminal.

5. The data transfer device according to claim 1, comprising:
   a buffer memory for temporarily storing a packet inputted from an input circuit,
   a selector for selectively inputting said packet into said buffer memory,
   a buffer control unit which controls write and read of said packet to and from said buffer memory.

6. The data transfer device according to claim 1, wherein:
   a routing unit, together with said buffer control unit, transfers a packet to a data relay unit, and
   the data relay unit transfers said packet to an output circuit corresponding to routing information.

7. The data transfer device according to claim 1, wherein said forwarding table is formed by a content addressable memory.

8. The data transfer device according to claim 1, wherein:
   a method which decides the physical bank to be looked up when looking up said physical position which stores said look-up condition corresponding to said look-up key in said forwarding table, is identical to a method which decides the physical bank to be stored when said forwarding table stores said look-up condition.

9. The data transfer device according to claim 1, wherein a packet contains an Ethernet frame header.

10. The data transfer device according to claim 1, wherein a packet contains a SIM header used for MPLS transmission.

11. A data transfer device, comprising:
    a plurality of input circuits into which a packet is inputted,
    a plurality of output circuits which output a packet,
    a flow control unit which decides flow control information which shows the transfer priority of the input packet from the data contained in the header of the input packet, and
    a data relay unit which follows the transfer priority corresponding to the flow control information to transfer or discard the packet, wherein said flow control unit comprises:

a flow identification table management unit which extracts part or all of the data contained in the packet header, and commands a look-up using this as a look-up key, a flow identification table for outputting data regarding the physical position at which the look-up condition is stored in a memory based on said look-up key, a flow control table which stores flow control information corresponding to said look-up condition stored at said physical position, and a flow control table management unit which looks up said flow control information from said flow control table based on the data regarding said physical position, wherein:

said flow identification table is stored in an array formed by a plurality of physical banks of identical look-up bit width, and said flow identification table management unit comprises:

a function unit which performs a calculation for deciding a physical bank to be looked up from said look-up key, and a register which stores numbers for changing an output value of the function unit, and wherein said flow identification table management unit commands a look-up of said physical bank described by said register.

12. The data transfer device according to claim 11, wherein:

said flow identification table management unit comprises a look-up key generation unit which extracts part or all of the data contained in said packet header, and generates said look-up key, a look-up condition generation unit which generates said look-up condition stored in said flow identification table, a command control unit which generates a look-up command when looking up data regarding said physical position corresponding to said look-up key in said flow identification table, and generates a write command when storing said look-up condition in said flow identification table, and a physical bank decision unit which decides the physical bank to be looked up when looking up the data regarding said physical position corresponding to said look-up key relative to said flow identification table, and decides the physical bank to be stored from said look-up condition.

13. The data transfer device according to claim 12, wherein:

said physical bank decision unit comprises:

a function unit having said look-up key or said look-up condition as input, which outputs a value which shows the number of the physical bank to be looked up when looking up data regarding said physical position corresponding to said look-up key, or outputs a value which shows the number of the physical bank to be stored from said lookup condition, a register which shows the number of the physical bank corresponding to the output value from said function unit, and an output value converter which converts said output value into the number of the physical bank shown in the register, and commands look-up or registration of the physical bank shown by the conversion value.

14. The data transfer device according to claim 13, wherein said register can be set from a terminal connected to the exterior of the data transfer device, and the state of said register can be verified from said terminal.

15. The data transfer device according to claim 11, comprising:

a buffer memory for temporarily storing a packet inputted from said input circuit, a selector for selectively inputting said packet into said buffer memory, and a buffer control unit which controls write and read of said packet to and from said buffer memory.

16. The data transfer device according to claim 11, wherein:

said flow control unit, together with said buffer control unit, transfers said packet to said data relay unit, and said data relay unit transfers or discards said packet following the transmission priority corresponding to said flow control information.

17. The data transfer device according to claim 11, wherein:

said flow identification table is formed by a content addressable memory.

18. The data transfer device according to claim 11, wherein a method which decides the physical bank to be looked up when looking up said physical position which stores said look-up condition corresponding to said look-up key in said flow control table, is identical to a method which decides the physical bank to be stored when said flow control table stores said look-up condition.

19. The data transfer device according to claim 11, wherein said packet contains an Ethernet frame header.

20. The data transfer device according to claim 11, wherein said packet contains a SIM header used for MPLS transmission.

21. The data transfer device according to claim 12, wherein said packet contains an IP packet header.

* * * * *